United States Patent [19]

Zackovich

[11] Patent Number: 4,775,285
[45] Date of Patent: Oct. 4, 1988

[54] MULTI-FUNCTION WRECKER LIFT

[76] Inventor: Stanley E. Zackovich, 1102 E. First St., Cle Elum, Wash. 98922

[21] Appl. No.: 770,529

[22] Filed: Aug. 29, 1985

[51] Int. Cl.$^4$ ............................................... B60P 3/12
[52] U.S. Cl. ..................................... 414/563; 280/402
[58] Field of Search ......................... 414/563; 280/402

[56] References Cited

U.S. PATENT DOCUMENTS

| | | | |
|---|---|---|---|
| 4,304,519 | 12/1981 | Hubbard | 414/563 |
| 4,384,817 | 5/1983 | Peterson | 414/563 |
| 4,473,334 | 9/1984 | Brown | 280/402 X |
| 4,637,623 | 1/1987 | Bubik | 414/563 X |

*Primary Examiner*—Joseph E. Valenza
*Assistant Examiner*—Stuart J. Millman
*Attorney, Agent, or Firm*—Keith S. Bergman; Leon Gilden

[57] ABSTRACT

An elongated upright motor extendible and retractable support member is provided including relatively extendible upper and lower end sections and the upper end section is pivotally mounted from a rear upper portion of body of a tow truck for oscillation relative thereto about a first horizontal axis extending transversely of the chassis and the upper end section. The support member is swingable between a generally vertical lowered position and a raised inclined position with the lower end section swung outwardly and upwardly from the vehicle rear end and a motor extendible and retractable light and tow arm having relatively extendible front and rear ends as provided and the front end is mounted from the lower end section of the support member for oscillation relative thereto about a second horizontal axis extending transversely of the arm and the lower end section. The arm is swingable between a lowered position with the arm disposed generally 90° relative to the support member and projecting rearwardly therefrom and a raised position closely parallel the rear side of the support member. The rear end of the arm has a cross beam oscillatably supported therefrom and the opposite ends of the beam include structure for cradling the underside peripheral portions of the opposite side wheels of the vehicle to be towed. Further, motor structure is connected between the vehicle chassis and the upper end section of the support member for adjustably swinging the latter between the raised and lowered positions thereof.

12 Claims, 4 Drawing Sheets

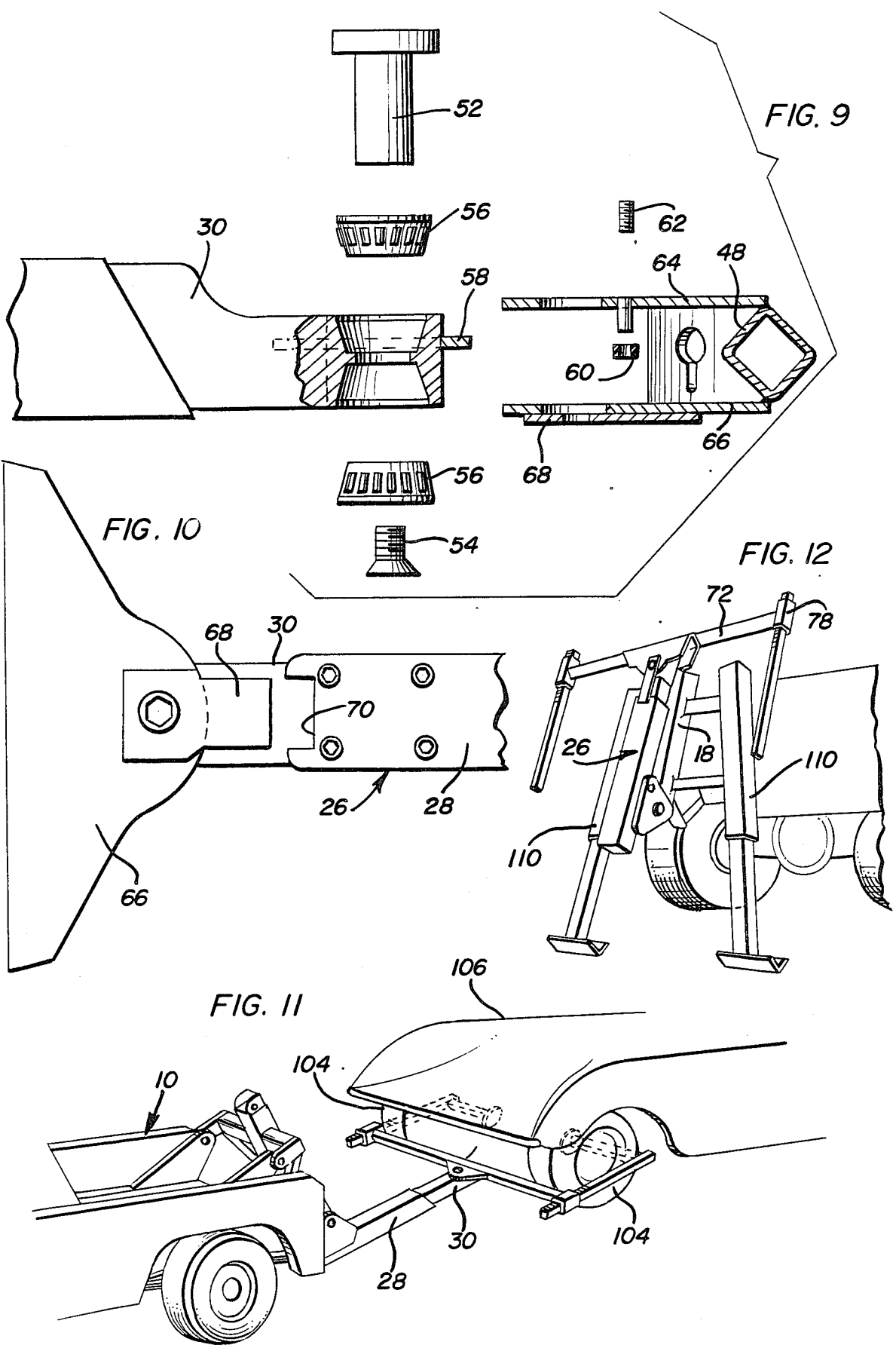

MULTI-FUNCTION WRECKER LIFT

BACKGROUND OF THE INVENTION

1. Field of the Invention

This invention relates to a mobile vehicle for lifting and towing other vehicles such as automobiles and trucks and more particularly to a mobile vehicle for facilitating the transport of disabled or driverless vehicles in many different vehicle towing environments.

2. Description of Related Art

Various forms of vehicle towing equipment heretofore have been provided for attaching to and supporting disabled vehicles as well as driverless vehicles from tow trucks for the purpose of enabling the tow truck to transport the vehicle to a remote location. One form of tow truck including structural and operational features which are similar to some of the general aspects of the instant invention is disclosed in U.S. Pat. No. 4,473,334. However, the wrecker or tow truck of the instant invention includes various structural features which particularly well adapt a tow truck to engage and lift various different types of disabled vehicles and which enable the tow truck operator to operate his vehicle engaging, lifting and anchoring structure with little effort and in a minimum of time.

SUMMARY OF THE INVENTION

The tow truck or wrecker of the instant invention includes an elongated upright support member including relatively extendible and retractable upper and lower end sections and the upper end section is mounted from the wrecker for pivotal motion about a first horizontal axis extending transversely of the wrecker and the upper end section at an elevation spaced appreciably above the ground engaging level of the wrecker. A combined lift and tow arm having front and rear ends has its front end pivotally mounted from the lower end section of the upright support member for pivotal motion relative thereto about a second horizontal axis extending transversely of the arm and the lower end section between a first position with the arm disposed at generally 90° relative to the support member and projecting rearwardly thereof and a second position with the rear end of the arm swung upwardly to a position with the arm disposed closely rearward of and substantially paralleling the support member. The arm is longitudinally extendible and retractable, under power, and the outer or rear end of the arm includes a pair of opposite side lift structures for engaging and lifting opposite side portions of a disabled vehicle end registered with and spaced from the rear of the wrecker. Further, the upright support member is pivotal between a generally vertical lower position and a raised inclined position with the lower end section thereof swung outwardly and upwardly from the rear end of the wrecker and motor structure is operatively connected between the wrecker chassis and the upper section of the support member for swinging the latter between the raised and lowered positions thereof.

The main object of this invention is to provide a wrecker which may be operated to quickly engage and lift a disabled or driverless vehicle preparatory to transport of that vehicle by the wrecker to a remote location.

Another object of this invention is to provide a wrecker whose vehicle engaging and lifting structure may be readily adjusted according to the size and type of disabled or driverless vehicle to be lifted and transported.

Still another object of this invention is to provide a wrecker whose vehicle engaging and lifting structure may be readily operated by the operator of the vehicle in a minimum amount of time for the purpose of engaging and lifting a disabled or driverless vehicle.

Yet another important object of this invention is to provide a wrecker which may be operated to engage and lift a disabled or driverless vehicle even when that vehicle is disposed in a close parallel-to-curb parked situation.

Another object of this invention is to provide a wrecker with vehicle engaging and lifting structure also operative to establish a pair of "stiff legs".

A final object of this invention to be specifically enumerated herein is to provide a wrecker in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 9 is a fragmentary exploded elevational view of the pivot connection between the rear end of the lift arm and the cross beam pivotally mounted on the rear end of the lift arm, parts of the lift arm rear end and cross beam being illustrated in vertical section;

FIG. 10 is a bottom plan view of the pivot connection between the lift arm rear end and cross beam and illustrating the manner in which the cross beam may be locked in a position disposed normal to the lift arm;

FIG. 11 is a fragmentary perspective view illustrating the manner in which the wrecker lift may be used to support the front end of a disabled or driverless vehicle therefrom;

FIG. 12 is a fragmentary perspective view of a modified form of the lift to be used in conjunction with a crane cable and wherein the lift is provided with opposite side downwardly and outwardly inclined "stiff legs" when the lift is in its raised inoperative position.

DETAILED DESCRIPTION OF THE INVENTION

Figure 1:
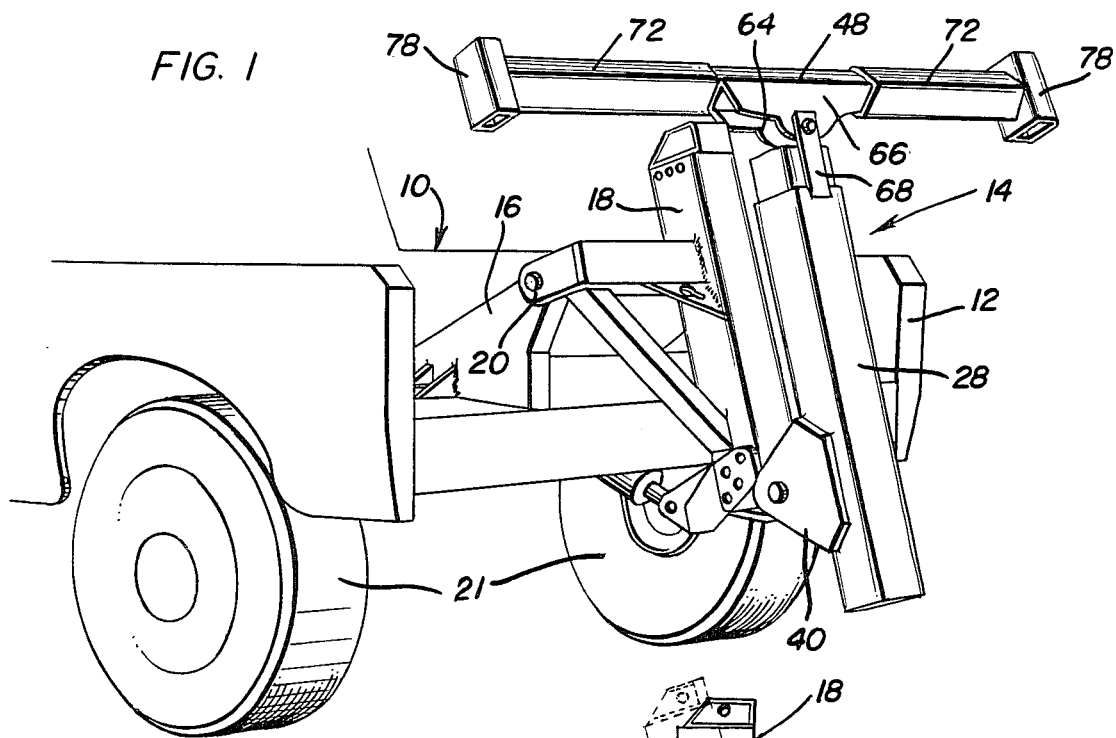
FIG. 1 is a fragmentary rear perspective view of a wrecker incorporating the lift mechanism of the instant invention.

Referring now more specifically to the drawings, the numeral 10 generally designates a conventional form of wheeled wrecker chassis including a rear end 12 and an opposite front end (not shown). A lift assembly referred to in general by the reference numeral 14 is supported from the rear end 12 and includes a stationary mount 16 from which an elongated upright support member 18 is pivotally mounted as at 20 for oscillation about a horizontal transverse axis at an elevation spaced appreciably above the lower peripheral portions of the rear wheels 21 of the wrecker chassis 10 which contact the ground and support the chassis 10 therefrom. The support member 18 includes upper and lower end sections 22 and 24 and the lower end section 24 is downwardly extendible and upwardly retractable relative to the upper end section 22 by a hydraulic cylinder (not shown) enclosed within the upper end section 22.

An elongated lift arm referred to in general by the reference numeral 26 is provided and includes front and rear base and free ends 28 and 30. The base end 28 is pivotally mounted from the lower end of the lower end section 24 as at 32 for oscillation about a horizontal transverse axis extending transversely of the lift arm 26 and the lower end section 24. Further, a hydraulic cylinder 34 enclosed within the tubular lower end section 24 is operatively connected to the base end 28 of the lift arm 26 through an arcuate link 36 and is operative to selectively angularly displace the lift arm 26 relative to the lower end section 24 of the support member 18. The cylinder 34 is operative to pivot the lift arm 26 between a position defining an included angle of slightly more than 90° relative to the support member 18 and a position substantially paralleling the support member 18, the lower end of the upper end section and the base end of the lift arm 26 including matching bevelled abutments 38 and 40 which engage each other when the lower end section 24 is fully upwardly retracted relative to the upper end section 22 and define a "working" angulation of the lift arm 26 relative to the support member 18 wherein the included angle defined between the support member 18 and the lift arm assembly 26 is substantially 90°.

The lift arm assembly 26 includes an interior hydraulic cylinder (not shown) wherein the free end 30 may be selectively extended and retracted relative to the base end 28, as desired. Further, a hydraulic cylinder 42 is operatively pivotally connected with an underside portion of the chassis 10 as at 44 and an anchor bracket carried by the lower end of the upper end section 22 as at 46 and is operative to angularly displace the support member 18 between the solid and phantom line positions thereof illustrated in FIG. 2.

The free end 30 of the lift arm 26 includes a cross beam 48 pivotally mounted thereon as at 50 through the utilization of a pivot pin 52, a threaded retainer 54 for the pivot pin 52 and a pair of combined thrust and journal bearings 56, see FIG. 9. The pivot connection at 50 also includes a C-chaped tension plate 58 carried by the free end 30 and a co-acting teflon tension disc 60 mounted from the cross beam 48 by a threaded stud 62, the tension disc and plate serving to frictionally retain the cross beam 48 in adjusted angular position. Furthermore, the cross beam is mounted from the free end 30 as at 50 through the utilization of upper and lower mounting plates 64 and 66 and the mounting plate 66 includes a locking tab 68 receivable in a locking notch 70 formed in the underside of the base end 28 of the lift arm 26 whereby the cross beam 48 will be locked in position disposed normal to the longitudinal center line of the lift arm 26 when the free end 30 is fully retracted relative to the base end 28, see FIG. 10.

Figure 6:
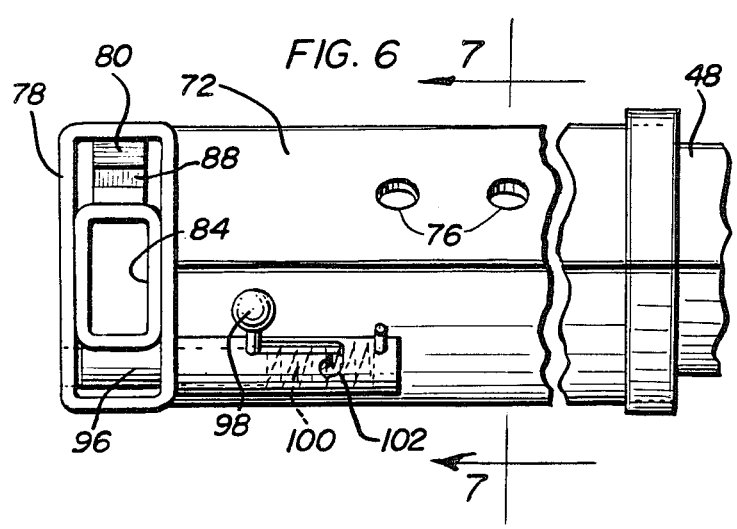
FIG. 6 is an enlarged fragmentary rear elevational view of one of the vehicle wheel engaging and lift arms of the lift and illustrating the locking mechanism thereof.
Figure 7:
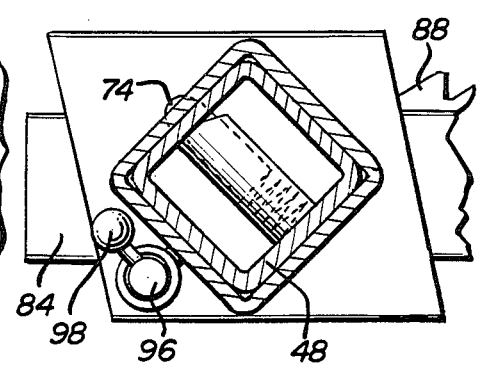
FIG. 7 is a vertical sectional view taken substantially upon the section line 7—7 of FIG. 6.

The opposite ends of the cross beam 48 have mounting tubes 72 telescopingly engaged thereon and retainable in adjusted extended positions through the utilization of spring biased detent elements 74 selectively receivable in longitudinally spaced apertures 76 formed in the mounting tubes 72, see FIGS. 6 and 7. In addition, the outer ends of the mounting tubes 72 include short parallel mounting sleeves 78 including internal upper and lower ratchet and support blocks 80 and 82. The long legs 84 of a pair of L-shaped lift arms 86 are longitudinally slidable through the sleeves 78 and include upper side rack-type ratchet teeth 88 thereon with which the ratchet blocks 80 are engageable to maintain the long legs 84 in adjusted longitudinally shifted positions when cantilever supported through the sleeves 78. The long legs 84 extend rearwardly from the sleeves 78 and the mounting tubes 74 and have right angled and inwardly directed short legs 90 mounted on their rear ends, the inner ends of the short legs 90 including enlarged abutment flanges 92 mounted thereon. Further, the mounting tubes 72 include longitudinally spaced friction lugs 94 thereon and each of the mounting tubes 72 includes a spring biased and retractable locking shaft 96 which may be engaged under the rear end of the corresponding long leg 84 and through an aperture 98 provided therefor in the outer side of the corresponding sleeve 78. When the locking shaft 96 is retracted by the attendant handle 98 against the biasing action of the spring 100 and retained in the lateral portion 102 of the slot through which the handle 98 is slidable, the rear ends of the long legs 84 adjacent the short legs 90 may be raised in order to disengage the ratchet teeth 88 from the ratchet bar 80. This will enable the long legs 84 to be shifted longitudinally through the sleeves 78 to the position desired. Thereafter, the rear ends of the long legs 84 may be lowered in order to engage the ratchet blocks 8 with the ratchet teeth 88 to retain the long legs 84 in adjusted shifted positions. Thereafter, the handle 98 may be manually shifted to allow the locking shafts 96 to be received beneath the long legs 84 and thereby preventing the rear ends of the long legs 84 from being raised relative to the sleeves 78.

Figure 2:
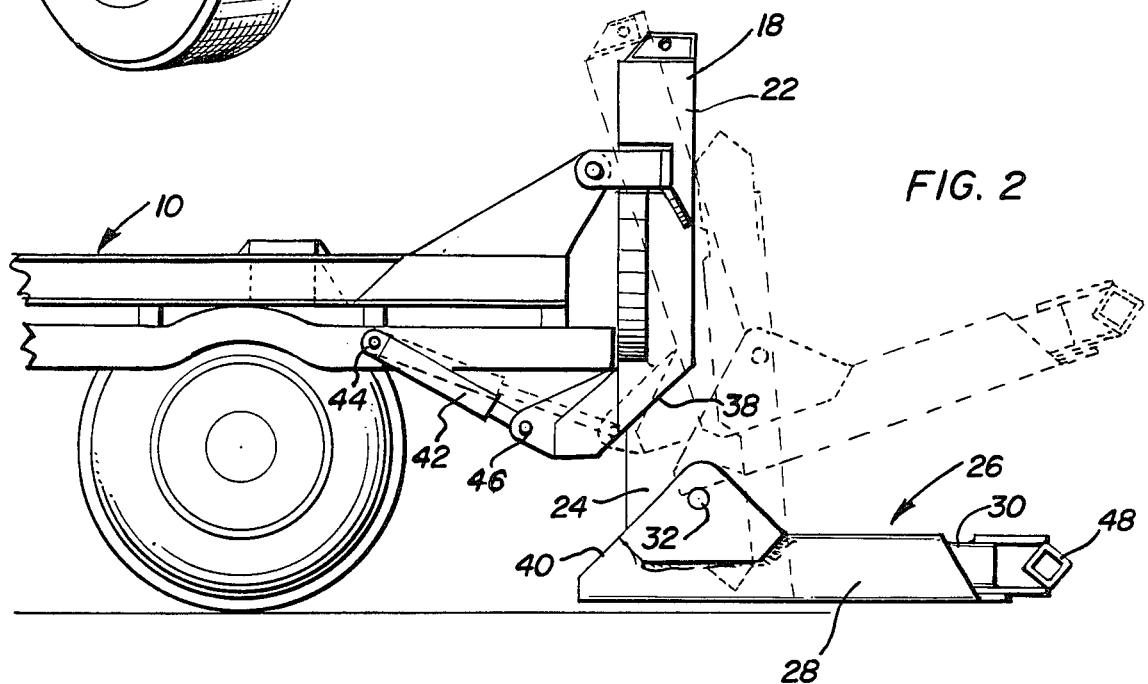
FIG. 2 is a fragmentary side elevational view of the rear of the wrecker as seen from the left side thereof and with the lift mechanism shown in alternate positions, the body of the wrecker being removed.

When it is desired to engage and lift the front wheels 104 of a vehicle 106 in the manner illustrated in FIG. 11, the lift assembly 14 is initially positioned as illustrated in solid lines in FIG. 2 with the rear of the wrecker chassis 10 aligned with the front end of the vehicle 106. Thereafter, the free end 30 may be forcibly extended by the hydraulic cylinder (not shown) contained within the lift arm 26 in order to force the short legs 90 beneath and rearwardly of the front wheels 104. The lower rear and lower forward peripheral portions of the wheels 104 are thereby cradled between the short legs 90 and the mounting tubes 92 with the forward lower peripheral portions of the wheels 104 engaging the lugs 94 and the rear lower peripheral portions of the wheel 104 disposed outwwardly of the plates 92. Thereafter, the free end 30 may be retracted (or left in an extended position) and the lower end section 24 may be upwardly retracted relative to the upper end section 22 until the abutments 38 and 40 engage each other. This will cause the front wheels 104 of the vehicle 106 to be lifted above the ground and the cylinder 42 may thereafter be actuated to swing the support member 18 from the solid line position thereof illustrated in FIG. 2 to the phantom line position of FIG. 2.

If the free end section 30, however, is left in an extended position, it will be necessary to provide some means whereby the cross beam 48 will be prevented against pivoting relative to the rear end section 30. If, on the other hand, the rear end section 30 is retracted fully, the locking tab 68 automatically seats in the notch 70 on the base end 28 and locks the cross beam 48 against angular displacement relative to the free end 30.

With attention now invited more specifically to FIG. 12 of the drawings, it may be seen that the support member 18 is provided with a pair of downwardly and outwardly inclined as well as hydraulic cylinder actuated downwardly extendible stiff leg assemblies 110. The stiff leg assemblies 110 are used when the lift assembly 14 is not being used to support a vehicle in the manner illustrated in FIG. 11, but when a winch (not shown) on the wrecker chassis 10 is being used to pull a disabled vehicle out of a ditch or from over an embankment.

Figure 13:
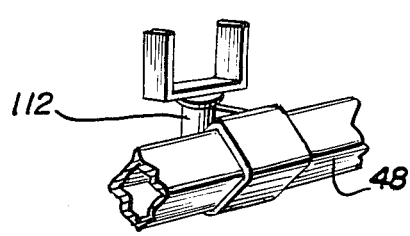
FIG. 13 is a fragmentary perspective view illustrating another form of vehicle engaging and lifting structure which may be removably supported from the rear cross beam pivotally mounted from the rear of the lift arm.
Figure 3:
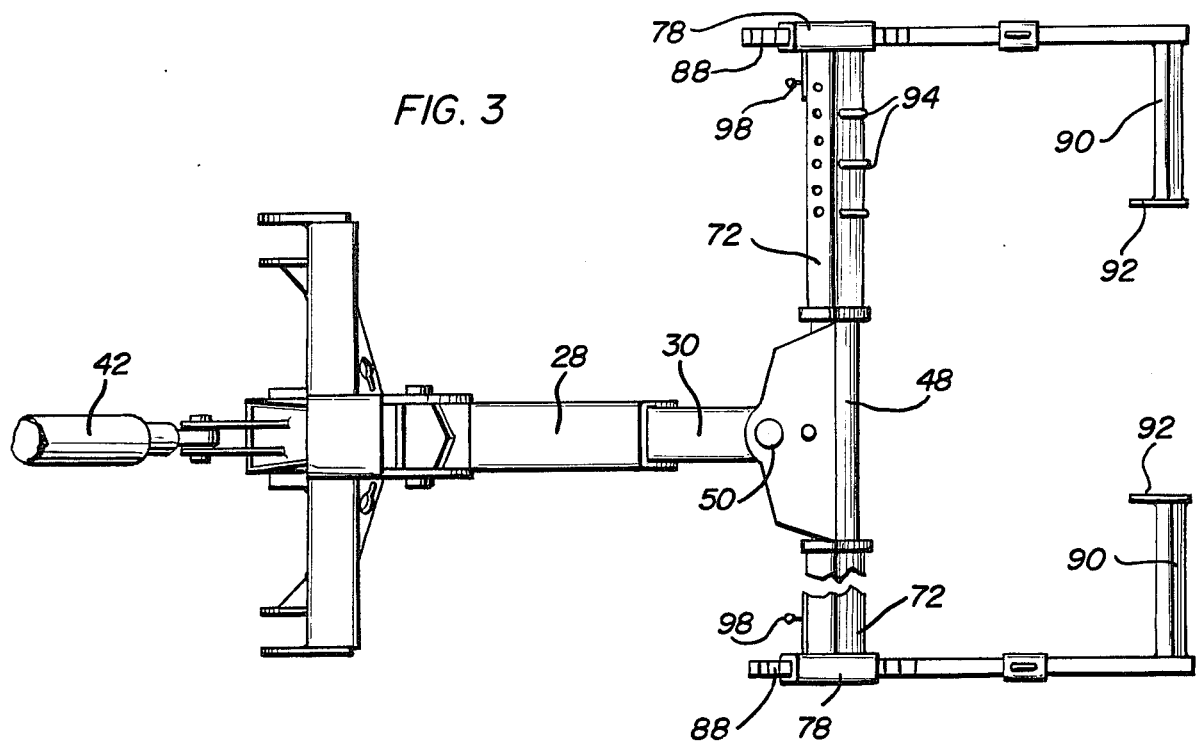
FIG. 3 is a top plan view of the lift arm structure of the lift with one side portion of the vehicle wheel engaging and lifting structure being broken away.
Figure 4:
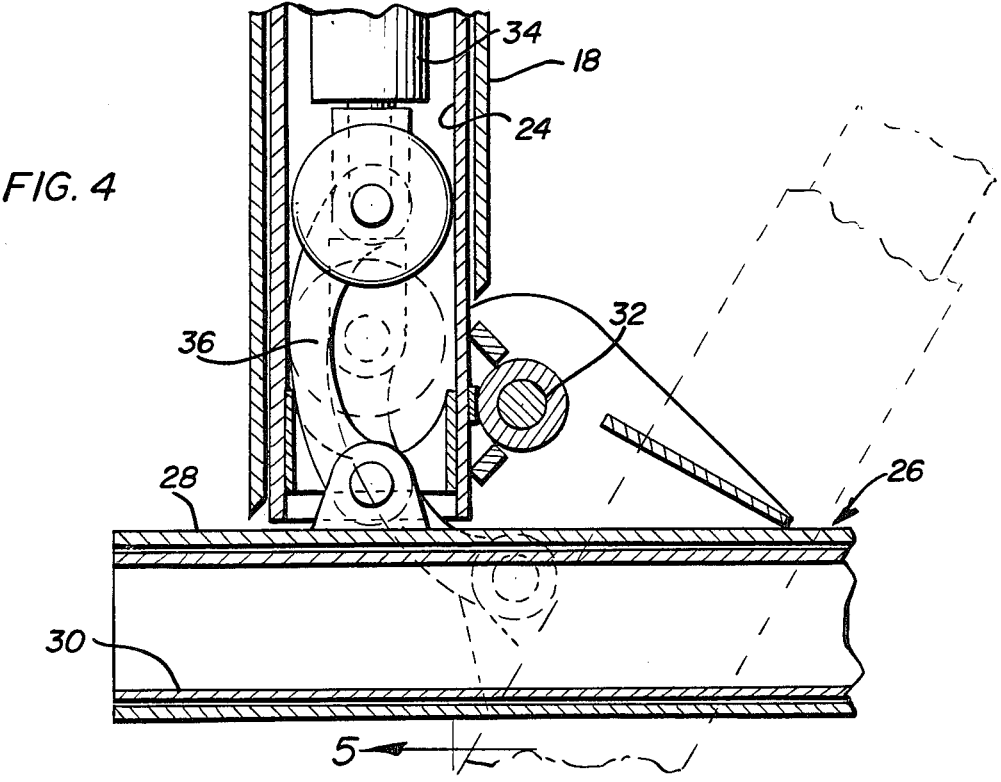
FIG. 4 is a fragmentary enlarged vertical sectional view illustrating the manner in which the lift arm structure may be pivoted from a generally horizontal rearwardly projecting position toward an upwardly inclined retracted position.
Figure 5:
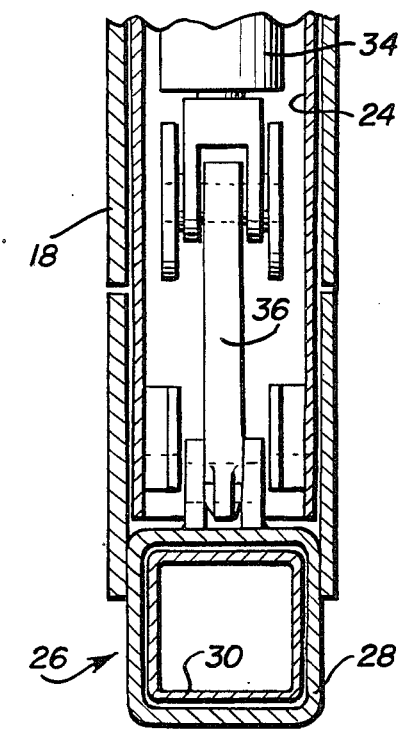
FIG. 5 is a fragmentary vertical sectional view taken substantially upon the plane indicated by the section line 5—5 of FIG. 4.
Figure 8:
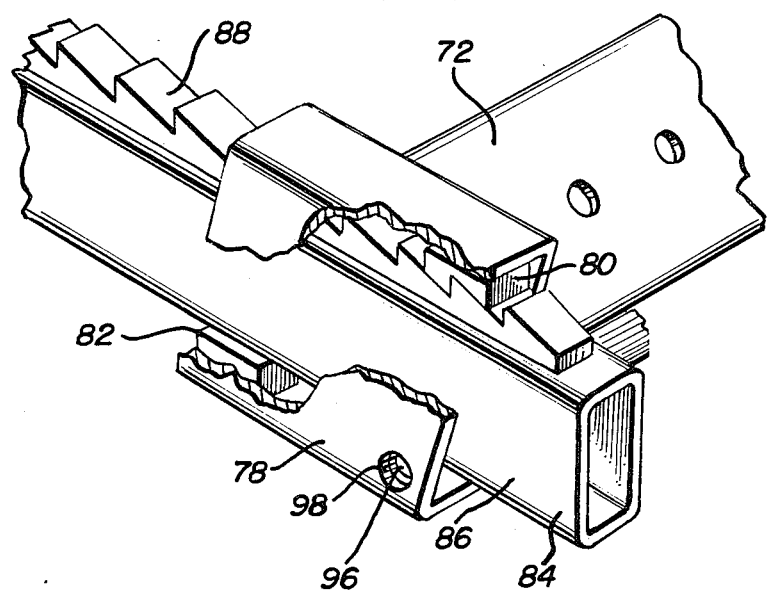
FIG. 8 is a fragmentary perspective view of the assemblage illustrated in FIGS. 5 and 6 and with a near wall portion of the support sleeve broken away and illustrated in section.

With attention now invited to FIG. 13, the mounting tubes 72 may be removed from the opposite ends of the cross beams 48 and sleeve mounted lift brackets 112 may be mounted on the opposite ends of the cross beam 48 to accomplish lifting operations on a disabled vehicle other than that illustrated in FIG. 11. Further, the cross beam 48, when the free end 30 is extended, may be angulated almost 90° to either side and a disabled vehicle may be rolled forwardly, or rearwardly, over the short legs 90 to position the wheels of such a disabled vehicle between the short legs 90 and the mounting tubes 72. Thereafter, the cylinder 42 may be extended in order to cause the adjacent end of such a disabled vehicle to be lifted above the ground. Then, the wrecker chassis 10 may be moved forwardly until the cross beam 48 is disposed normal to the lift arm 26 and the free end 30 then may be retracted in order to lock the cross beam 48 in the position thereof illustrated in FIG. 11.

It is to be noted that once the vehicle 106 has been lifted in the manner illustrated in FIG. 11, suitable chains or other means may be utilized to insure that the wheels remain cradled between the short legs 90 and the mounting tubes 72. Further, the mounting tubes 72 may, of course, be extended or retracted as required by the width of the wheel track of the vehicle 106. Also, any suitable control console (not shown) may be provided on the wrecker chassis 10 for remote actuation of the various hydraulic cylinders including those incorporated in the stiff leg assemblies 110.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A multi-function wrecker including an elongated vehicle chassis for support from the ground having front and rear ends, an elongated relatively movable extendible and retractable upright support member including upper and lower sections, first pivot means mounting said upper section from said rear end of said chassis for pivotal motion relative thereto about a first horizontal axis extending transversely of said chassis and said upper section at an elevation spaced above portions of the chassis, said upper section extending downwardly below said axis, said support member is pivotal between a generally vertical lowered position and a raised inclined position with the lower section swung outwardly and upwardly from said vehicle rear end, a combined lift and tow arm having a base and free end, angularly displaceable second pivot means mounting said base end from a lower portion of said lower section for pivotal motion relative thereto about a second horizontal axis extending transversely of said arm and lower section between first and second limit positions with said arm disposed at generally ninety degrees relative to said support member in said first limit position and said free end of said arm projecting outwardly of the rear end of said chassis when said arm is in said first limit position and said arm disposed to the rear of and generally paralleling said support member when said arm is in said second limit position, the free end of said arm mounting a pair of lift means for engaging and lifting opposite side portions of a vehicle and spaced from the rear end of said chassis, first force means connected between said chassis and said upper section for swinging said support member between the lowered and raised position thereof, said first force means comprising an extensible cylinder connected to said support member at one end and to said chassis at the cylinder's extended distal end wherein said connections are positioned below said first pivot means.

2. The wrecker of claim 1 including second force means connected between said support member lower section and said arm for swinging said arm between said first and second limit positions.

3. The wrecker of claim 1 wherein the free end of said arm includes a horizontal cross beam mounted therefrom for limited pivotal motion relative thereto about a third axis disposed transverse to said arm and the longitudinal mid-portion of said beam and also transverse to said first and second axis, said lift means being carried by the opposite ends of said cross beam.

4. The wrecker of claim 1 wherein said lift means includes means operative to cradle the opposite side wheels of said vehicle end between front and rear lower peripheral portions of each of said opposite side wheels.

5. The wrecker of claim 1 wherein said arm comprises a motor extendible and retractable arm including relatively extendible front and rear end sections comprising said base and free ends.

6. The wrecker of claim 5 wherein the rear end of said arm includes a horizontal cross beam mounted therefrom for limited pivotal motion relative thereto about a third axis disposed transverse to said arm and the longitudinal mid-portion of said beam and also transverse to said first and second axis, said lift means being carried by the opposite ends of said cross beam, said cross beam and said front end section including coacting means operative to releasably lock said cross beam in a position disposed generally normal to said arm against pivotal motion relative thereto about said third axis when said rear end section is fully retracted relative to said front end section.

7. The wrecker of claim 1 wherein said support member includes opposite side downwardly and outwardly inclined and downwardly extendible stiff legs.

8. The wrecker of claim 5 wherein the rear end of said arm includes a horizontal cross beam mounted therefrom for limited pivotal motion relative thereto about a third axis disposed transverse to said arm and the longitudinal mid-portion of said beam and also transverse to said first and second axis, said lift means being carried by the opposite ends of said cross beam, said cross beam and said front end section including coacting means operative to releasably lock said cross beam in a position disposed generally normal to said arm against pivotal motion relative thereto about said third axis when said rear end section is fully retracted relative to said front end section, said lift means including means operative to cradle the opposite side wheels of said vehicle end from front and lower rear peripheral portions of each of said opposite side wheels.

9. The wrecker of claim 8 including second force means connected between said support member lower section and said arm for swinging said arm between said first and second limit positions.

10. The wrecker of claim 1 wherein the free end of said arm includes a horizontal cross beam mounted therefrom for limited pivotal motion relative thereto about a third axis disposed transverse to said arm and the longitudinal mid-portion of said beam and also transverse to said first and second axis, said lift means being carried by the opposite ends of said cross beam, said lift means including support sleeves carried by the opposite ends of said cross beam and generally paralleling said arm when said cross beam is disposed normal to the latter, a pair of generally L-shaped lift members each including a pair of long and short legs disposed at generally ninety degrees relative to each other, said long legs being slidably received through said sleeves with said short legs projecting toward each other and opposing and generally paralleling adjacent ends of said beam, said long legs and sleeves including coacting means operative to releasably retain said long legs in adjusted shifted positions relative to said sleeves.

11. The wrecker of claim 10 wherein said sleeves are supported from said cross beam ends for adjusted shifted positioning therealong.

12. A multi-function wrecker including a longitudinal ground supported vehicle chassis having front and rear ends, an elongated upright support member including upper and lower end sections, means mounting said upper end section from said rear end of said chassis for pivotal motion relative thereto about a first horizontal axis extending transversely of said chassis and said upper end section at an elevation spaced appreciably above the portions of said vehicle provided to support the latter from the ground and with the support member swingable between a generally vertical lowered position and a raised inclined position with the lower end section swung outwardly and upwardly from said vehicle rear end, a combined lift and tow arm having base and free ends, means mounting said base end from a lower portion of said lower end section with said arm disposed at generally ninety degrees relative to said support member and said free end of said arm projecting outwardly of said rear end of said chassis, a horizontal cross beam mounted on the rear end of said arm for limited pivotal motion relative thereto about a second axis disposed transverse to said arm and the longitudinal mid-portion of said beam and also transverse to said first axis, a pair of generally parallel horizontal sleeves mounted from the opposite ends of said beam and generally paralleling said arm when said beam is disposed normal to said arm, said sleeves being mounted on said beam ends for adjustable positioning therealong, said sleeves each including lift means for engaging and lifting opposite side portions of a vehicle end registered with and spaced from the rear end of said chassis, said lift means including means operative to cradle the opposite side wheels of said vehicle end, said lift means including generally L-shaped lift members each including a pair of long and short legs disposed at generally ninety degrees relative to each other, said long legs being longitudinally shiftably received through said sleeves with said short legs projecting toward each other and opposing the opposite ends of said beam, said short legs and the opposing portions of said beam being adapted to cradle lower peripheral portions of said wheels therebetween.

* * * * *